(12) United States Patent
Chew et al.

(10) Patent No.: US 6,652,797 B1
(45) Date of Patent: Nov. 25, 2003

(54) METHOD FOR DETERMINING RESIN CURING AREAS IN AN OPTICAL STEREOLITHOGRAPHY PROCESS

(75) Inventors: Ying Kit Chew, Singapore (SG); Yoke San Wong, Singapore (SG); Ying His Jerry Fuh, Singapore (SG); Han Tong Loh, Singapore (SG); Yeh Ching Andrew Nee, Singapore (SG); Yoo Sang Choo, Singapore (SG); Li Lu, Singapore (SG); Kah Bin Lim, Singapore (SG); Chee Leong Teo, Singapore (SG); En Tang Kang, Singapore (SG); Tetsuo Miyazawa, Singapore (SG)

(73) Assignee: National University of Singapore (SG)

( * ) Notice: Subject to any disclaimer, the term of this patent is extended or adjusted under 35 U.S.C. 154(b) by 0 days.

(21) Appl. No.: 09/700,012

(22) PCT Filed: Apr. 30, 1999

(86) PCT No.: PCT/SG99/00036

§ 371 (c)(1),
(2), (4) Date: May 30, 2001

(87) PCT Pub. No.: WO99/59030

PCT Pub. Date: Nov. 18, 1999

(30) Foreign Application Priority Data

May 8, 1998 (SG) ................................................. 801021

(51) Int. Cl.⁷ ......................... B29C 35/08; B29C 41/02; G06F 17/50; G06F 19/00
(52) U.S. Cl. ....................................... 264/401; 700/120
(58) Field of Search ........................... 264/401; 700/120

(56) References Cited

U.S. PATENT DOCUMENTS

| 5,238,639 A | | 8/1993 | Vinson et al. | ............... 264/401 |
| 5,659,478 A | | 8/1997 | Pennisi et al. | ................. 700/95 |
| 5,902,538 A | * | 5/1999 | Kruger et al. | ............... 264/401 |

FOREIGN PATENT DOCUMENTS

EP        0484182 A1    5/1992

* cited by examiner

*Primary Examiner*—Leo B. Tentoni
(74) *Attorney, Agent, or Firm*—David Jaffer; Pillsbury Winthrop LLP

(57) ABSTRACT

A method for determining the areas of resin to be cured in an optical stereolithography process for rapid prototyping using sequential laser curing of layers of a resin having a selected thickness to produce a desired shape of cured resin. The method includes the steps of generating a computer model of desired shape and dividing the model into layers of thickness equal to the thickness of the layers each defining an area of resin to be cured. A set of layers including and sequentially adjacent an intermediate layer is selected and the areas in the intermediate layer of resin which would be oversized by laser curing of layers later in the curing sequence is determined. The 2-D layer data used to build a 3-D model is modified to compensate for the oversizing and the steps repeated by sequentially selecting sets of layers to include substantially all of the layers as the intermediate layer. The sets are sequentially selected with each subsequent set having the intermediate layer being the layer adjacent the intermediate layer of the previously selected set. The first selected set includes the first layer to be cured and the sequential subsequent sets respectively include as the intermediate layer the subsequently cured adjacent layer.

11 Claims, 7 Drawing Sheets

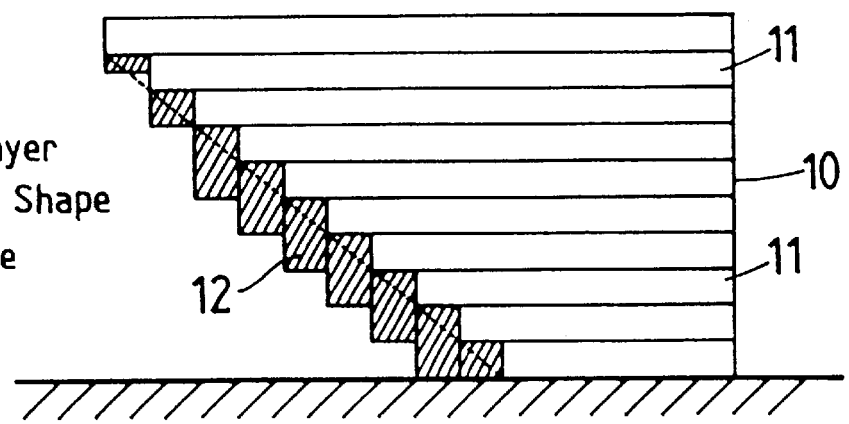
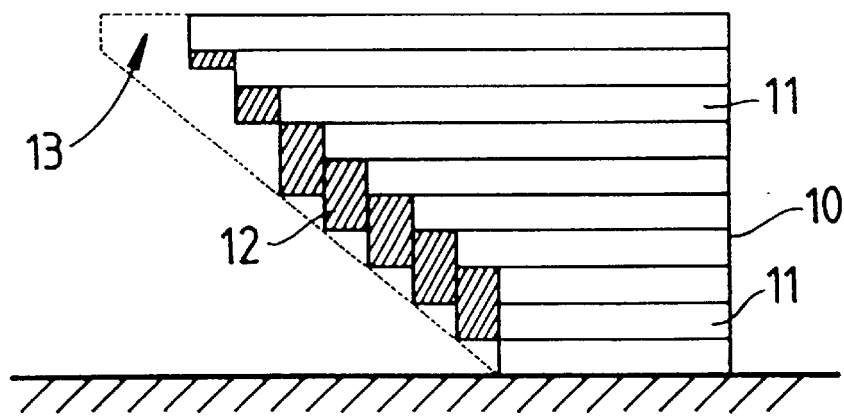
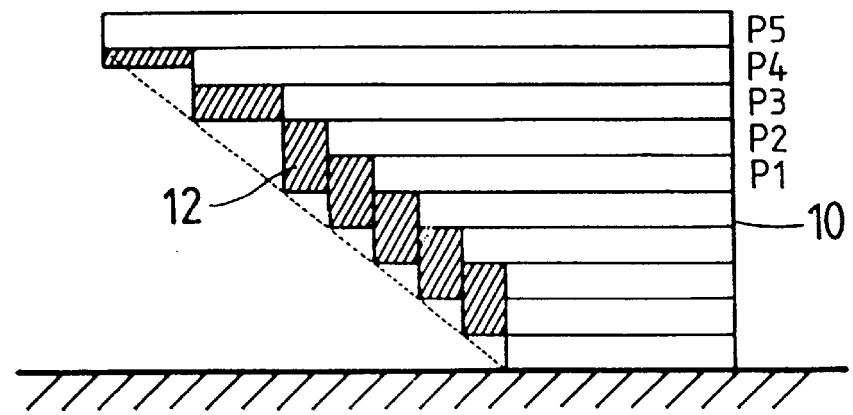

☐ Scan Layer
-------- Desired Shape
▨ Oversize

METHOD FOR DETERMINING RESIN CURING AREAS IN AN OPTICAL STEREOLITHOGRAPHY PROCESS

This application is the national phase of international application PCT/SG99/00036 filed Apr. 30, 1999, which designated the U.S.

FIELD OF THE INVENTION

This invention relates to optical stereolithography processes for rapid prototyping. More particularly, it relates to a method for determining the areas of resin to be cured in an optical stereolithography process for rapid prototyping. This invention also provides a method for controlling an optical stereolithography system to reduce the inaccuracy or oversizing of parts in the part built (z-) direction due to overpenetration of the laser beam and overcuring of the resin.

BACKGROUND OF THE INVENTION

Optical stereolithography is a manufacturing technology that uses a sequential additive layer method to build complex three dimensional objects from computer data. The technique uses a combination of computer graphics, laser polymerization and photochemistry technologies. Its many benefits include significant productivity gains and cost saving in product design, and the ability to introduce concept models in a short period of time. The process relies on a scanning ultraviolet laser beam to harden successive thin layers of photopolymer, building each layer on top of the previous layer until a three-dimensional part has been formed.

The technology is popular in industry for rapid prototyping. Considerable effort has been directed to improving the accuracy of the fabricated model, especially the accuracy in the vertical or Z-direction by reducing oversizing. The Z-directional inaccuracy or oversizing can be as high as 200 $\mu$m compared to 50 $\mu$m in the X and Y directions. The X- and Y-errors, however, can be corrected easily in most optical stereolithography machines. In spite of its great potential, the dimensional errors, if not corrected properly, will limit the application of rapid prototyping parts to design verification only.

There are two causes of the oversizing. The first is that the laser power is normally selected to cure the photomonomer to a depth, d greater than the layer thickness, Lp to ensure bonding between the layers. Thus, when curing the bottom-most layer of an over-hanging part, below which is liquid resin rather than the stage or the previously cured layer, a layer is formed thicker than the desired layer pitch.

The second cause is that when the second layer is scanned or cured by the laser beam, the liquid resin below the previously cured layer is also cured. This is due to the over-penetration effect of the laser, suggesting that the solid resin is more transparent to the UV laser than the liquid resin. This over penetration effect may give rise to further overcuring of the liquid resin below the cured layers when a third layer is scanned by the laser. FIG. 1 shows the oversizing effect caused by over-penetration of the laser. The following is shown in FIG. 1:

$L_p$: desired layer pitch (also the amount the stage will be lowered after each step).
$d_1$: cure depth of the first layer.
$d_2$: total cure depth of the first and second layers.
$d_3$: total cure depth of the first, second and third layers.
$\delta_d$: oversizing due to over-penetration effect of the laser beam.

FIG. 1 compares the actual depth, d, and the desired layer pitch, Lp, of the cured layer 1 for both a part overhanging a forming stage 2 and a non-overhanging and an overhanging part. It also shows the overcuring 3 from a single scan of layer 1 and the oversizing effect 4, 5 caused by over-penetration of the laser from scanning a second layer 6 and a third layer 7.

More recent US patents on optical stereolithography, such as U.S. Pat. No. 5,256,340, and U.S. Pat. No. 5,571,471, offer no solution to overcome the inaccuracy due to the oversizing effect. U.S. Pat. No. 5,398,193 teaches a subtractive or removal procedure to remove surplus material formed in various forming processes. Japanese patent applications No. 125078:1995 and No. 125079:1995 teach off-setting the 3-D model data with the value of the oversize to improve the accuracy of the model.

DISCLOSURE OF THE INVENTION

An object of this invention is to provide a method for determining the areas of resin to be cured in an optical stereolithography process for rapid prototyping. It is a further object of the invention to provide an improved optical stereolithography process to produce more accurate models for rapid prototyping.

In one aspect this invention provides a method for determining the areas of resin to be cured in an optical stereolithography process for rapid prototyping using sequential laser curing of layers of a resin having a selected thickness to produce a desired shape of cured resin, said method comprising the steps of:

(a) generating a computer model of said desired shape;

(b) dividing the model into layers of thickness equal to the thickness of said layers each defining an area of resin to be cured by corresponding layer data;

(c) selecting a set of said layers including and sequentially adjacent an intermediate layer and determining the areas in said intermediate layer of resin which would be oversized by said laser curing of one or more layers later in the curing sequence;

(d) modifying said layer data to compensate for said oversizing; and (e) repeating steps (c) and (d) by sequentially selecting said sets of layers to include substantially all of said layers respectively as said intermediate layers.

Preferably the sets are sequentially selected with each subsequent set having the intermediate layer being the layer adjacent the intermediate layer of the previously selected set.

It is also preferred that the first selected set includes the first layer to be cured and the sequential subsequent sets respectively include as the intermediate layer the subsequently cured adjacent layer.

Preferably each set includes N layers where N is selected from the series 3, 5, 7 or higher odd numbers determined by the size of possible oversizing from laser curing of the resin in terms of numbers of layer thickness to be compensated.

In one specific form the invention provides a method to compensate for oversizing of two layer thickness including:

(a) naming polygons defined by said layers in the computer model as P1, P2 . . . PK . . . starting at the first layer to be cured;

(b) selecting the first five layers P1 to P5 as said selected set and determining said intermediate layer to be middle layer P3;

(c) determining the areas in layer P3 that are potentially oversized by one layer thickness due to laser curing of layer P4, denoted by Poly 1=P3∩P4;

(d) determining the areas in Poly 1 in which oversizing would actually occur as a result of no cured resin in corresponding areas of the adjacent earlier cured layer, by finding the difference between Poly 1 and P2, denoted by Poly 2=Poly 1∩$\overline{P2}$.

(e) determining the areas in P3 that are potentially oversized due to laser curing of layer P5, denoted by Poly 3=Poly 1∩P5≡P3∩P4∩P5;

(f) determining the areas in Poly 3 in which a second layer oversizing will actually occur as a result of no cured resin in corresponding areas two layers earlier by finding the difference between Poly 3 and P1, denoting the area as Poly 4=Poly 3∩$\overline{P1}$; and (g) sequentially repeating the steps (b) to (f) for each set of 5 layers starting from the second layer of the previous set and continuing until all sets of layers in the model have been processed.

Preferably, the computer model is modified by removing from layer P3 all the areas that would produce oversizing one and two layers below it and denoting the resultant polygon, represented by P3∩$\overline{Poly\ 2}$∩$\overline{Poly\ 4}$, as the modified layer.

In another specification the invention provides a method to compensate for oversizing of two layer thickness including (a) naming polygons defined by said layers in the computer model as P1, P2 . . . PK . . . starting at the first layer to be cured;

(b) selecting the first five layers P1 to P5 as said selected set and determining said intermediate layer to be middle layer P3;

(c) determining the areas in layer P3 that are potentially oversized by one layer thickness due to laser curing of layer P4, and representing the areas (P3∩P4)∩$\overline{P2}$≡P3∩P4∩$\overline{P2}$;

(d) determining in layer P3 where oversize would occur two layers earlier as a result of laser curing in layer P5, and representing the areas by P3∩P4∩P5∩$\overline{P1}$; and (e) modifying the computer model by removing from layer P3 all the areas where oversize would occur below it as a result of laser curing in layers P4 and P5, the resultant polygon being represented by P3∩$\overline{[(P3∩P4)∩\overline{P2}\ ]∩[P3∩P4∩P5]∩\overline{P1}}$ ≡P3∩$\overline{(P3∩P4∩P2)∩(P3∩P4∩P5)∩P1}$ Preferably, sequential layers are cured in a z direction of an orthogonal x, y, z co-ordinate system. The z direction, preferably, corresponds to the vertical direction or built direction in the stereolithography process so that the first cured layer is the lower layer.

The modified layer data can be stored for example in a computer memory, magnetic media or optical media.

The invention also includes within its scope a method for controlling an optical stereolithography system for rapid prototyping to reduce oversizing including the above method of determining the areas of resin to be cured.

One embodiment of the invention will now be described by way of example only.

BRIEF DESCRIPTION OF THE DRAWINGS

FIG. 2(a) is a side view of a wedge-shaped model built using an optical stereolithography process without any compensation.

FIG. 2(b) is a side view of the wedge-shaped model built using an optical stereolithography process with constant offset of two layers.

FIG. 2(c) is a side view of the wedge-shaped model built using an optical stereolithography process incorporating the method of this invention with intelligent offsetting.

FIG. 3 shows two different views of a wedge-shaped model which are used to illustrate the method according to this invention.

BEST MODES FOR CARRYING OUT THE INVENTION

Figure 1:
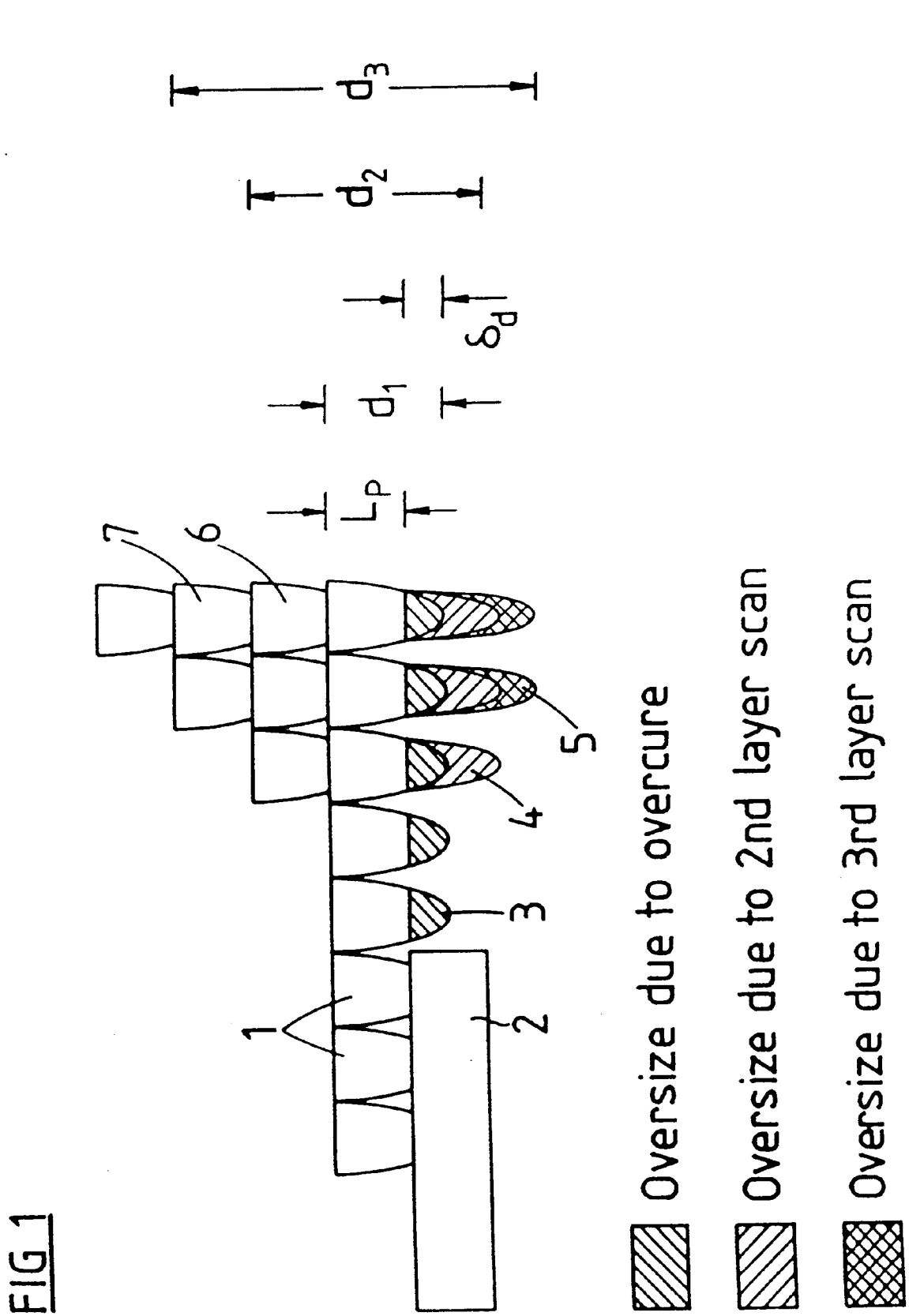
FIG. 1 schematically shows the oversizing resulting from curing of successive layers in a prior art optical stereolithography process.

As described above parts produced using optical stereolithography techniques have oversizing inaccuracies. Different parameters used during the processing of the part will produce different oversize effects. Any technique compensating for these inaccuracies has to cater for these variations. For example, in FIG. 2(a), if a wedge-shaped model 10 is to be built using a layer 11 pitch of 200 $\mu$m and the maximum oversize is 400 $\mu$m , then the oversize 12 is equivalent to 2 layers. As shown in FIG. 2(a), if there is no offset or compensation, the model will have a maximum oversize 12 of 2 layers along the slope of the model.

The method of this invention is illustrated in overcoming the oversizing effect for the cases when the maximum oversize is two layers (example 1) and when the maximum oversize is one layer (example 2). It is possible, from various combinations of laser beam and photoresin characteristics and layer pitch selection that the oversize effect may be three or even more layers. However, for practical purposes, a three or more layer oversizing can usually be avoided by appropriate selection of the laser beam and resin characteristics. However, it should be noted that similar solutions for the three layer or more layer oversizing can be obtained using the same approach.

EXAMPLE 1

Two Layer Oversizing Problem

Prior art techniques of offsetting for the effect of the two layer oversize may result in some missing features. As shown in FIG. 2(b) in a wedge-shaped model 10, when a current technique of offsetting is applied, that is, every layer is offset by 2 layers so that the oversize 12 conforms to the desired shape, some features 13 are lost at the top of the model 10.

This invention provides a more selective compensating technique which reduces missing features and increases dimensional accuracy. FIG. 2(c) is an example of the result of using the compensation technique of this invention to form a wedge-shaped model 10. Instead of fixing the number of layers 11 to offset, the areas causing the oversize are identified and removed to achieve a better accuracy. The technique consequently improves the accuracy of the model built by the optical stereolithography process.

Figure 3A:
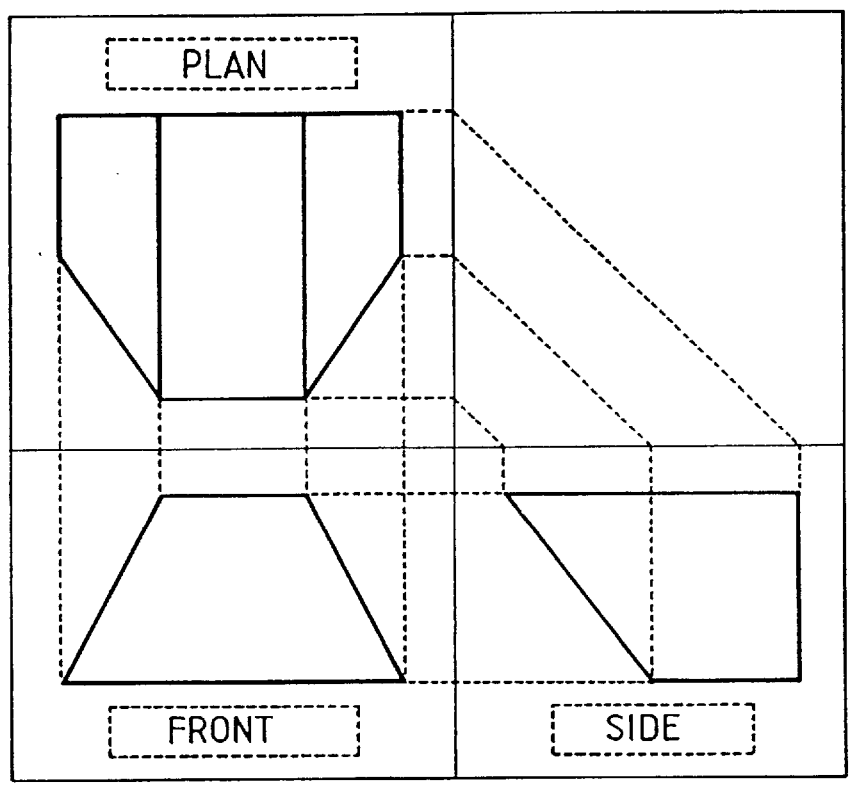
FIG. 3(a) depicts the model in orthogonal views and FIG. 3(b) is an isometric view.
Figure 3B:
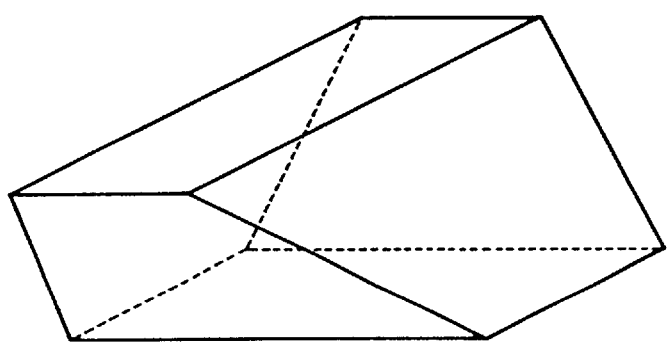

FIGS. 3(a) and 3(b) show the same illustrative model depicted in orthogonal and isometric views respectively.

For a two layer oversizing problem the oversize effects, as determined from actual observation and rounded off to the nearest half layer, are shown in Table 1. According to the data in Table 1 and referring to FIG. 1 as illustration, it will be observed that:

(i) laser curing by scanning over one layer alone will produce and oversize with a thickness of half a layer if there is no cured resin or stage under the scanned layer. This half layer thick oversize is due to the overcuring of the scanned resin.

(ii) laser curing scanning another layer over the first scanned layer also cure the resin under the previously cured layer and produce an oversize with a total thickness of one layer.

(iii) further scanning one or more layers over the previously scanned layers will produce and additional layer under the previously formed oversized layer. The maximum oversize beneath three or more scanned layers is thus two layers.

TABLE 1

| Layers scanned | 1 | 2 | 3 | 4 or more |
|---|---|---|---|---|
| Oversize (cummulative) (in terms of layers) | 0.5 | 1 | 2 | 2 |

The process of identifying the areas where oversize will occur is illustrated in FIG. 4 which correspond to the plan view of FIG. 3(a). The computer model is divided into layers P1, P2, . . . PK . . . of thickness equal to the layer thickness of the optical stereolithography process.

Figure 4A:
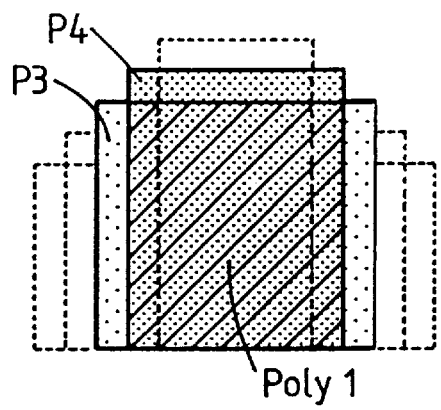
FIGS. 4(a) to 4(f) show the plan views of the steps in a 5-layer offsetting algorithm in a 2 layer oversizing problem according to the method of this invention.

There are five cross-sectional layers, P1 to P5, under consideration at each time. The basic steps involve:

(a) Determining the possible areas in P3 under which oversizing may occur due to laser scanning in P4. This is done by finding the intersection between P3 and P4. Let Poly 1=P3∩P4. This is illustrated in FIG. 4a The polygon, Poly 1, is the area in P3 where a next layer P4 will be scanned on top of it. If a cured layer P2 does not exist underneath Poly 1, oversizing will occur since part of the laser beam used for curing P4 will penetrate through P3 and further cure the liquid resin beneath P3. Otherwise, if there is a cured layer P2 underneath Poly 1, oversize will not occur.

Figure 4B:
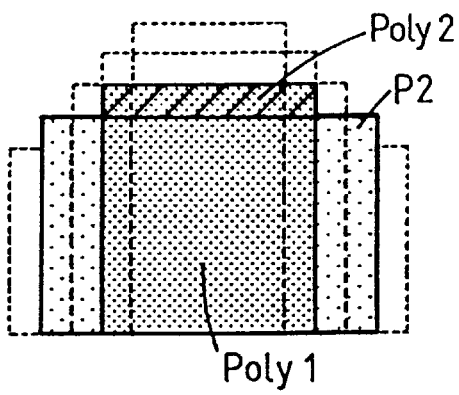

(b) Determining the areas in Poly 1 under which oversize will actually occur. This is done by finding the difference between Poly 1 and P2: Poly 2=Poly 1∩$\overline{P2}$. This is shown in FIG. 4b. The resulting polygon, Poly 2, is the area in P3 where a next layer (P4) will be scanned on top of it and there is no cured layer underneath. In other words, liquid resin will be found under P3 in the area marked by Poly 2. Hence, when scanning P4, part of the laser energy will penetrate through P3 and produce oversizing in the liquid resin under Poly 2.

Figure 4C:
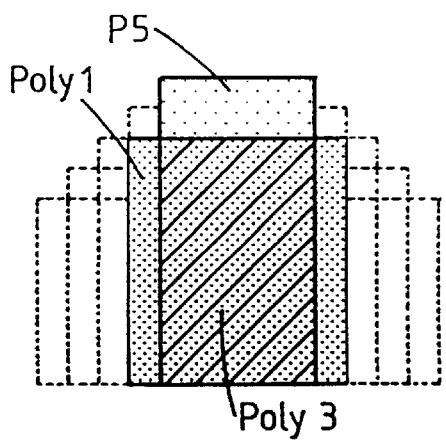

(c) Determining the possible areas in P3 under which oversizing may occur due to scanning in P5. From Table 1, there is an increase in the oversize by one additional layer when the third layer is scanned. In this case, the third layer of Table 1 corresponds to P5 and this means that scanning in P5 may also cause oversizing under P3. Therefore, it has to be considered in the algorithm. To determine the areas in P3 under which possible oversize will occur due to scanning in P5, the intersection between Poly 1 and P5 is found. As shown in FIG. 4c Poly 3=Poly 1∩P5. Poly 1 is used instead of P3 (i.e. P3∩P5 is not used) for this computation because the areas of intersection between P3 and P5 may not overlap any part of P4. If that happens, the laser beam passing through P5 will not pass through any cured resin to produce overgrowth under P3 but will cure the liquid resin underneath P5. Alternatively, Poly 3 is also equivalent to P3∩P4∩P5. The resulting polygon, Poly 3, is the area in P3 where two consecutive layers will be scanned on top of it. If there are two layers of cured resin P2 and P1 underneath Poly 3, oversize will not occur since the overgrowth (if any) will be created in P2 and P1 itself. Otherwise, oversizing will occur when P5 is scanned.

Figure 4D:
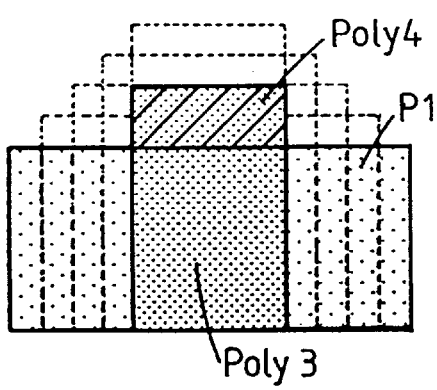

(d) Similarly, determining the areas in Poly 3 under which oversizing will occur in the P1 layer by finding the difference between Poly 3 and P1. Referring to FIG. 4d the resulting polygon, Poly 4, will be the area in P3 where two consecutive layers P4 and P5 will be scanned on top of it but there is no cured resin underneath it. In other words, liquid resin will be found in the area marked by Poly 4 under P3 or P2. Hence, oversize will be produced in these areas.

Figure 4E:
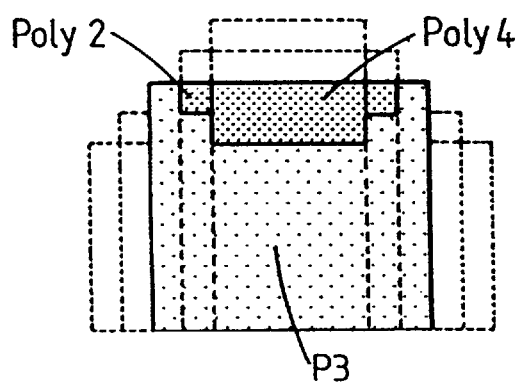
Figure 4F:
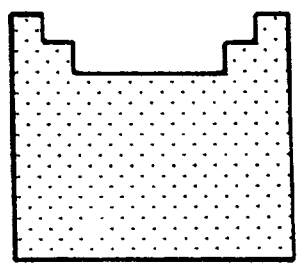

(e) Subtracting from P3 the areas Poly 2 and Poly 4 under which oversizing will occur, produces the desired polygon as shown in FIG. 4e. The resultant polygon is P3∩$\overline{\text{Poly 2}}$∩$\overline{\text{Poly 4}}$. The resulting Modified Polygon shown in FIG. 4f is stored as the modified layer to replace P3 as the layer to be scanned in a modified layers file.

(f) Repeating the process for the next set of layers and so on starting with the second layer of the previous set as the first layer of the next set of layers, until the last set of 5 layers has been considered.

(g) Sending the modified layers file to the optical stereolithography system for the actual fabrication of the rapid prototyping part after all the layers have been offset or modified.

Figure 5:
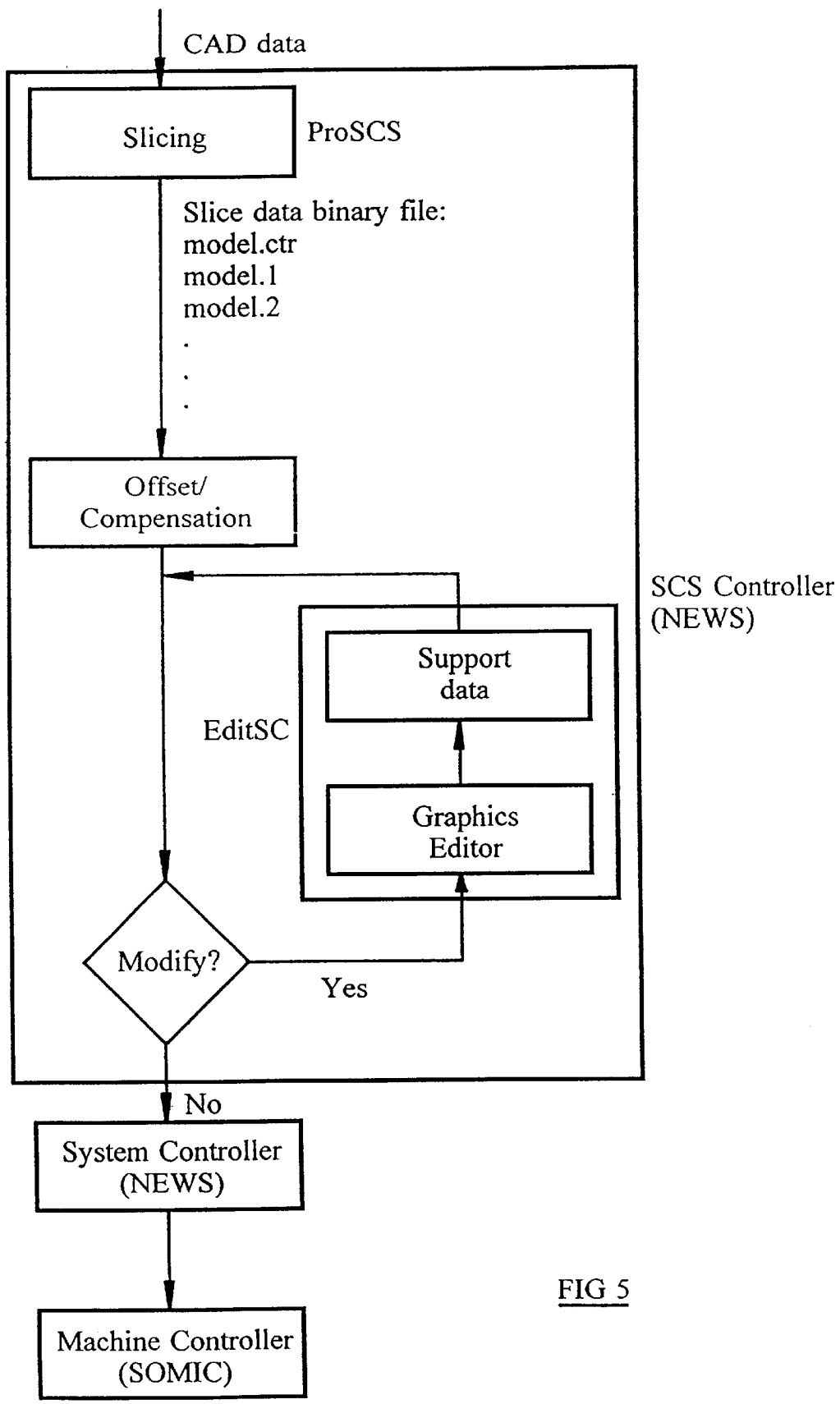
FIG. 5 shows the implementation of the method of this invention in a commercial optical lithography machine, SONY SCS system.

FIG. 5 is a flow chart showing the implementation of the above method to create a more accurate model using a Sony Solid Creator System (SCS). As seen in the Figure the following basic steps are performed:

1) CAD data of STL, IGES or HPGL format are created and passed to the Sony SCS workstation.

2) NEWS (UNIX workstation developed by Sony) receives the CAD data and computes the cross-section slice data at equal intervals of 0.1 mm to 0.3 mm using a data processing software called ProSCS.

3) These data are subsequently converted into binary files under the names model.ctr, model.1, model.2 and so on.

4) The SCS software offsets the laser scan along layers by a half size of the laser spot. This is to compensate for the oversizing caused by the laser spot of half a diameter. The proposed compensation algorithm written in C language then modifies the sliced layer data based on the overlapping layer geometry which might cause oversize of a model.

5) The user can then manually edit the slice data in graphic model using the graphical editor (EditSC).

6) User can also choose to automatically or manually create the support data as usual if necessary.

7) When the slice data are transferred to the system controller, it converts them into DE commands (digital electronic commands which contains information on the co-ordinates and laser control that the scanner CPU understands), pulse sequences and control signals which are then sent to the machine controller.

8) Upon receiving the messages from the system controller, the machine controller starts building the solid model layer upon layer by repetitive scanning and hardening of the UV resin surface using the X-Y laser scanner.

It will be apparent that the invention can be implemented using other optical stereolithography systems.

EXAMPLE 2

One Layer Oversizing Problem

In the one layer oversizing problem the oversize characteristics are given in Table 2.

TABLE 2

| Layers scanned | 1 | 2 | 3 or more |
|---|---|---|---|
| Oversize (cummulative) (in terms of layers) | 0.5 | 1 | 1 |

Figure 6A:
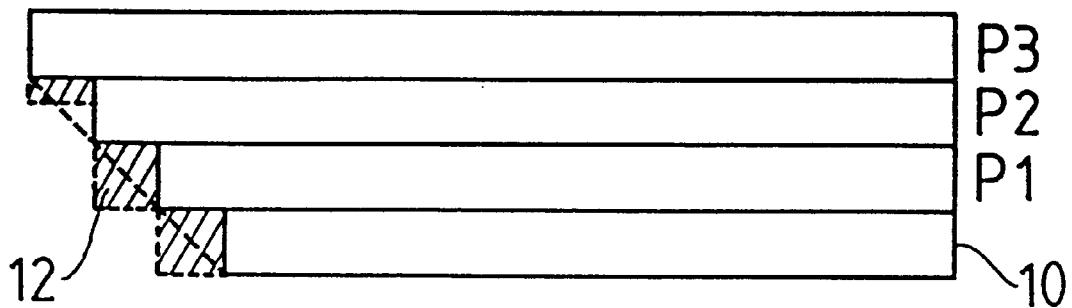
FIGS. 6(a) and 6(b) show side views of a model built with and without offset according to this invention for a one layer oversizing example.
Figure 6B:
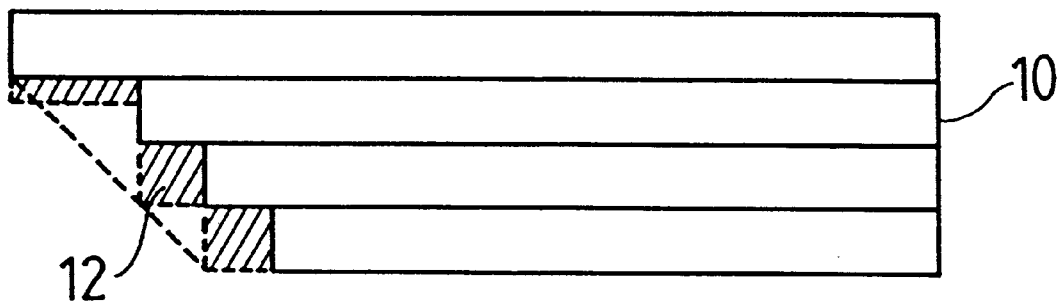

FIGS. 6(a) and 6(b) show side views of a wedge-shaped model, built with and without offset. Based on the oversize characteristics the oversizing effect for a set of three layers is as follows:

(i) Scanning of one layer alone will produce an oversize of half a layer thick, which is solely the overcure.

(ii) Scanning another layer over the cured layer will further cure the liquid resin beneath the latter, resulting in the overgrowth, and thereby increasing the oversize to one layer thick (overcure+overgrowth).

(iii) Further scanning over two existing layers will not further increase the oversize.

Figure 7A:
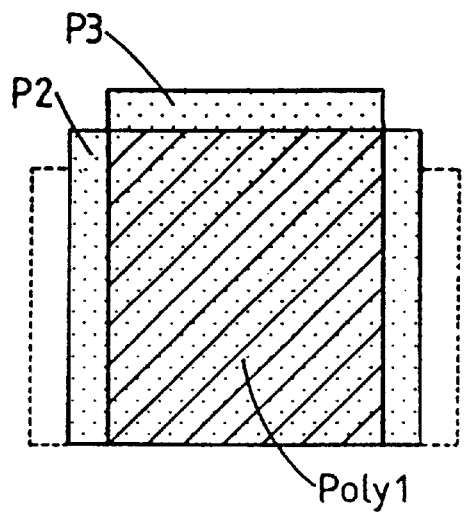
FIGS. 7(a) to (d) show the procedures of a three layer offsetting method according to this invention in a one layer oversizing model.

The process of identifying the areas where oversizing will occur and removing them is illustrated in FIGS. 7(a) to 7(d) (based on plan views of the model). In this case a set of three layers P1, P2, P3 is to be considered in order to modify each of the second or middle layers of the set. The basic steps in determining the modified scan area for P2 and subsequent layers involve:

(a) Determining the areas in P2 where oversizing may occur under P2 due to scanning of P3. This is done by finding the intersection between P2 and P3. Poly 1=P2∩P3. As shown in FIG. 7a the resulting polygon, Poly 1, is the area in P2 where a next layer P3 will be scanned on top of it. If there is no cured layer P1 underneath Poly 1, oversizing will occur since part of the laser beam used for curing P3 will penetrate through P2 and further cure the liquid resin beneath P2. Otherwise, if there is a cured layer P1 underneath Poly 1, oversizing will not occur.

Figure 7B:
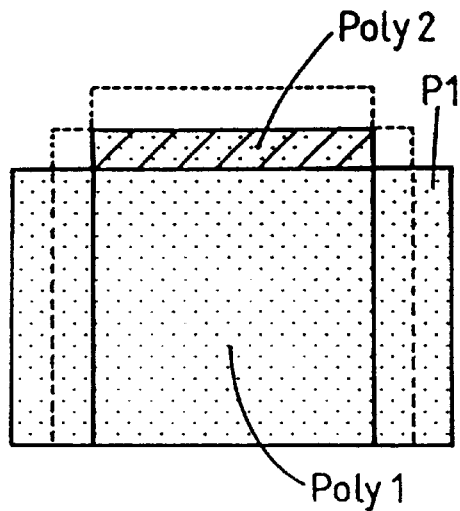

(b) Determining the areas in Poly 1 where oversizing will occur. This is done by finding the difference between Poly 1 and P1: Poly 2=Poly 1∩$\overline{P1}$. As shown in FIG. 7b the resulting polygon, Poly 2, is the area in P2 where a next layer P3 will be scanned on top of it and there is no cured layer underneath. In other words, liquid resin will be found in the area marked by Poly 2 and under P2. Hence, when scanning P3, part of the laser energy will penetrate through P2 and produce overgrowth in the liquid resin under Poly 2.

Figure 7C:
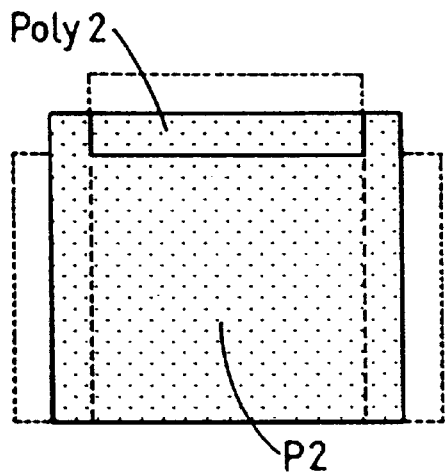
Figure 7D:
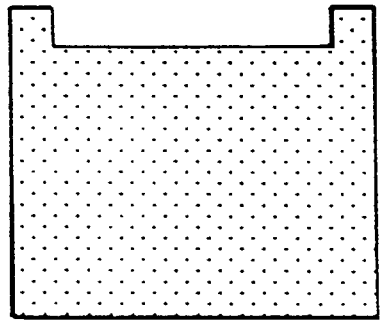

(c) Subtracting from P2 the areas under which oversizing would occur, to give the Modified Polygon=P2∩$\overline{Poly\ 2}$ as shown in FIG. 7c. The modified polygon in FIG. 7d is stored for use in place of P2 in a modified layers file.

(d) Repeating the process for the next set of 3 layers and so on starting from the second layer of the previous set of layers until the Modified Polygons for all the layers are determined.

(e) After all the layers have been offset, sending the modified layers file to the optical stereolithography system for actual fabrication.

The foregoing describes only some embodiments of the invention and modifications can be made without departing from the scope of the invention.

What is claimed is:

1. A method for determining the areas of resin to be cured in an optical stereolithography process for rapid prototyping using sequential laser curing of layers of a resin having a selected thickness to produce a desired shape of cured resin, said method comprising the steps of:

(a) generating a computer model of said desired shape;

(b) dividing the model into layers of thickness equal to the thickness of said layers each defining an area of resin to be cured by corresponding layer data;

(c) selecting a set of said layers including and sequentially adjacent an intermediate layer and determining the areas in said intermediate layer of resin which would be oversized by said laser curing of one or more layers later in the curing sequence;

(d) modifying said layer data to compensate for said oversizing; and (e) repeating steps (c) and (d) by sequentially selecting said sets of layers to include substantially all of said layers respectively as said intermediate layers.

2. A method as claimed in claim 1 wherein said sets are sequentially selected with each subsequent set having said intermediate layer being the layer adjacent the intermediate layer of the previously selected set.

3. A method as claimed in claim 2 wherein the first selected set includes the first layer to be cured and the sequential subsequent sets respectively include as the intermediate layer the subsequently cured adjacent layer.

4. A method as claimed in claim 1 wherein each said set includes N layers where N is selected from the series 3, 5, 7 or higher odd numbers determined by the size of possible oversizing from laser curing of the resin in terms of numbers of layer thickness to be compensated.

5. A method as claimed in claim 1 to compensate for oversizing of one layer thickness including:

(a) naming polygons defined by said layers in the computer model as P1, P2 . . . PK . . . starting at the first layer to be cured;

(b) selecting the first three layers P1 to P3 as said selected set and determining said intermediate layer to be middle layer P2;

(c) determining the areas in layer P2 that are potentially oversized due to laser curing of layer P3, denoted by Poly 1=P2∩P3;

(d) determining the areas in Poly 1 in which oversizing would actually occur as a result of no cured resin in corresponding areas of the adjacent earlier cured layer, by finding the difference between Poly 1 and P1, denoted by Poly 2=Poly 1∩$\overline{P1}$;

(f) sequentially repeating the steps (b) to (e) for each set of 3 layers starting from the second layer of the previous set and continuing until all sets of layers in the model have been processed.

6. A method as claimed in claim 1 to compensate for oversizing of two layer thickness including:
   (a) naming polygons defined by said layers in the computer model as P1, P2 . . . PK . . . starting at the first layer to be cured;
   (b) selecting the first five layers P1 to P5 as said selected set and determining said intermediate layer to be middle layer P3;
   (c) determining the areas in layer P3 that are potentially oversized due to laser curing of layer P4, denoted by Poly 1=P3∩P4;
   (d) determining the areas in Poly 1 in which oversizing would actually occur as a result of no cured resin in corresponding areas of the adjacent earlier cured layer, by finding the difference between Poly 1 and P2, denoted by Poly 2=Poly 1∩$\overline{P2}$;
   (e) determining the areas in P3 that are potentially oversized due to laser curing of layer P5, denoted by Poly 3=Poly 1∩P5=P3∩P4∩P5;
   (f) determining the areas in Poly 3 in which a second layer oversizing will actually occur as a result of no cured resin in corresponding areas two layers earlier by finding the difference between Poly 3 and P1, denoting the area as Poly 4=Poly 3∩$\overline{P1}$; and
   (g) sequentially repeating the steps (b) to (f) for each set of 5 layers starting from the second layer of the previous set and continuing until all sets of layers in the model have been processed.

7. A method as claimed in claim 6 wherein the computer model is modified by removing from layer P3 all the areas that would produce oversizing one and two layers below it and denoting the resultant polygon, represented by P3∩$\overline{\text{Poly 2}}$∩$\overline{\text{Poly 4}}$, as the modified layer.

8. A method as claimed in claim 1 to compensate for oversizing of two layer thickness including
   (a) naming polygons defined by said layers in the computer model as P1, P2 . . . PK . . . starting at the first layer to be cured;
   (b) selecting the first five layers P1 to P5 as said selected set and determining said intermediate layer to be middle layer P3;
   (c) determining the areas in layer P3 that are potentially oversized by one layer thickness due to laser curing of layer P4, and representing the areas (P3∩P4)∩$\overline{P2}$=P3∩P4∩$\overline{P2}$;
   (d) determining in layer P3 where oversize would occur two layers earlier as a result of laser curing in layer P5, and representing the areas by P3∩P4∩P5∩$\overline{P1}$; and
   (e) modifying the computer model by removing from layer P3 all the areas where oversize would occur below it as a result of laser curing in layers P4 and P5, the resultant polygon being represented by P3∩$\overline{[(P3\cap P4)\cap \overline{P2}\,]\cap[P3\cap P4\cap P5]\cap \overline{P1}}$ =P3∩($\overline{P3\cap P4\cap P2}$)∩($\overline{P3\cap P4\cap P5}$)∩P1.

9. A method as claimed in claim 1 wherein said sequential layers are cured in a z direction or built direction.

10. A method as claimed in claim 9 wherein the z direction corresponds to the vertical direction in the stereolithography process so that the first cured layer is the lowest layer.

11. A method as claimed in claim 1 wherein said data for said modified layer is stored in a computer memory, magnetic media or optical media.

* * * * *

UNITED STATES PATENT AND TRADEMARK OFFICE
CERTIFICATE OF CORRECTION

PATENT NO.    : 6,652,797 B1
DATED         : November 25, 2003
INVENTOR(S)   : Chew et al.

It is certified that error appears in the above-identified patent and that said Letters Patent is hereby corrected as shown below:

<u>Title page,</u>
Item [75], Inventors, "Tetsuo Miyazawa" should read -- Tatsuo Miyazawa --.

Signed and Sealed this

Thirteenth Day of January, 2004

JON W. DUDAS
*Acting Director of the United States Patent and Trademark Office*